(12) United States Patent
Kammler et al.

(10) Patent No.: US 6,205,751 B1
(45) Date of Patent: Mar. 27, 2001

(54) METHOD AND DEVICE FOR FEEDING OF ARTICLES INTO A MOVING, ROTATING TRANSPORTING DEVICE

(75) Inventors: Roman Kammler, Worms; Walter Baur, Gruendau, both of (DE)

(73) Assignee: Rovema Verpackungsmaschinen GmbH, Fernward (DE)

(*) Notice: Subject to any disclaimer, the term of this patent is extended or adjusted under 35 U.S.C. 154(b) by 0 days.

(21) Appl. No.: 09/272,014

(22) Filed: Mar. 18, 1999

(30) Foreign Application Priority Data

Mar. 20, 1998 (DE) .............................. 198 12 248

(51) Int. Cl.[7] .............................. B65B 57/02; B65B 3/04
(52) U.S. Cl. .................................. 53/473; 53/69; 53/250
(58) Field of Search ...................... 53/67, 69, 250, 53/467, 473, 244; 198/577, 341.09, 626.3, 626.4, 606, 461.1

(56) References Cited

U.S. PATENT DOCUMENTS

| | | | |
|---|---|---|---|
| 4,114,752 | * 9/1978 | Schiek | 53/67 |
| 4,117,649 | * 10/1978 | Egli | 53/250 |
| 4,124,967 | * 11/1978 | Beer et al. | 53/250 |
| 4,558,779 | * 12/1985 | Schmitt et al. | 198/626.3 |
| 5,209,046 | * 5/1993 | Tapscott et al. | 53/250 |
| 5,655,355 | * 8/1997 | Ramler | 53/244 |

* cited by examiner

Primary Examiner—Brian L. Johnson
Assistant Examiner—Matthew Luby
(74) Attorney, Agent, or Firm—Flynn, Thiel, Boutell & Tanis, P.C.

(57) ABSTRACT

In order to be able to quickly and inexpensively feed articles, in particular bags, into spaces, for example insides of folding boxes of a continuously moving, transporting device, the speed of the transporting device is slower during a feed-in operation than the speed of the transporting device outside of the feed-in operation. A control device is provided in a device for feeding in the articles in order to control this change in speed.

7 Claims, 5 Drawing Sheets

METHOD AND DEVICE FOR FEEDING OF ARTICLES INTO A MOVING, ROTATING TRANSPORTING DEVICE

FIELD OF THE INVENTION

The invention relates to a method for feeding of articles, in particular bags, into a moving, rotating or circulating transporting device, whereby the transporting device continues to move without standstill, and the articles are fed into provided spaces of the transporting device.

BACKGROUND OF THE INVENTION

It is known to feed articles into spaces of a transporting device, which is moved at a constant speed and which rotates, which spaces are provided one behind the other and are limited transversely with respect to the transporting direction. The articles are, for this purpose, initially accelerated by means of an accelerating band extending parallel to the transporting device to the same speed as the transporting device, and are then moved in a horizontal direction one after the other into the spaces.

It is furthermore known to operate a transporting device intermittently and to move during each standstill of the transporting device an article into a space of the transporting device provided for this purpose or to permit said article to fall from above into said space.

The known transporting device, which is moved at a constant speed, has the disadvantage that the technical input for an acceleration of the articles to the speed of the transporting device is relatively great, and that such devices are therefore relatively expensive.

The known intermittently operating transporting device has the disadvantage that due to the standstill times of the transporting device only a relatively low transporting performance can be achieved.

SUMMARY OF THE INVENTION

The purpose of the invention is to achieve a method and a device having a relatively high transporting performance. The device is, in addition, inexpensive and experiences relatively low wear.

The speed of a transporting device, which is moved continuously without standstill, is in the method of the invention slower during a feed-in operation than the speed of the transporting device outside of a feed-in operation.

The device of the invention has a transporting device, which rotates without standstill, and the drive of which is connected to a control device, which slows down the transporting device at a feed-in time, and again accelerates the transporting device at a later feed-in time.

The method of the invention and the device of the invention have the advantage that a relatively high transporting performance is achieved since standstill times do not occur during the operation of the device, and the transporting device is operated only during a feed-in operation at a reduced speed.

The feeding of the articles occurs in an inexpensive manner since articles accelerated to the speed of the transporting device are not demanded. Since such an accelerating device is not needed, the control device can be reduced by additional programming of an already existing control device and is principally less expensive than a separate accelerating device.

The invention permits relatively little wear of the device since static frictions, as they would occur during the standstill of a device, are avoided. With this, the necessary driving forces are reduced, and a performance-weaker, less expensive drive can be provided. The structural parts of the device are subjected to smaller wearing forces. To avoid an increased wear and for the use of a relatively performance-weak drive it is possible to move the transporting device so slow that a standstill of the transporting device does not occur. A particularly slow operation during a feed-in operation has, in addition, the advantage that the articles can be moved into relatively narrow spaces, whereby the outer dimension of an article in a transporting direction can only be insignificantly smaller than the inner dimension of a space in this direction. That is, a relatively accurately fitting feeding in is achieved.

When the feeding speed $V_3$ of the articles into the spaces is at least ten times greater than the transporting speed V of the transporting device, then a reliable feeding into relatively accurately fitting spaces is achieved.

When the articles have, directly prior to the moving-in or feeding-in operation, a speed component $V_{E1}$ aligned parallel to the transporting speed V, for example through a momentary impulse, push, or force onto the articles, parallel to the transporting direction, then maximum feed-in speeds can be achieved.

The articles can be fed in a horizontal direction or in a vertical direction downwardly into the spaces. A horizontal feeding $V_{e1}$ in is possible very time-exactly by means of a slide see slide 30, FIGS. 2, 4. During a vertical feeding at $V_{E2}$ in, gravitation can be utilized in order to achieve a very high feeding-in speed $V_6$.

However, it is also possible to throw the articles into the spaces with a defined initial speed. This has the advantage that a short feeding-in path can be realized.

Two belts, which rotate in opposite direction and receive an article between themselves, are suited as the mechanism for feeding in. The belts hold an article and emit same to a space at a moment or time depending on the first feed-in moment. If the space between the belts can be changed, then it is possible for this mechanism to feed in differently wide articles.

As a mechanism for feeding in, it is also possible to provide a vertical tubular bagging machine with Dshaped rotating cross-sealing jaws. Bags manufactured by the tubular bagging machine can in the case of this mechanism be fed with a precisely specified release speed in an inexpensive manner directly into the spaces. An additional mechanism for feeding in is completely eliminated. The tubular bags are emitted downwardly along a straight path of the D-shaped jaw path with a particularly precisely specified speed.

When the transporting device is a part of a cartoning system, then bags can in an advantageous manner be fed into boxes. The boxes are provided in an opened state in the spaces and are in an inventive manner provided with bags. When the transporting device is a cup band, then the cups of the cup band form the spaces.

A particularly high positioning exactness is possible when the inertia moment and the length expansion of the transporting device are relatively low. This is achieved when a rotating synchronous belt with partitions arranged equidistantly on the synchronous belt is provided as the transporting device, and the partitions consist of a light metal, in particular a magnesium alloy. A synchronous belt experiences after a certain duration of operation a clearly lesser length expansion than, for example, a transporting chain. The synchronous belt together with the partitions can, due to the comparatively low weight, be clearly more exactly positioned and it is possible to use a comparatively performance-weaker drive, which, because of its good positioning ability, should be a servomotor.

When a sensor is provided in order to recognize a space to be filled, and when the sensor is connected to the control device, then the sensor can specify a first feed-in moment by sensing a space.

A particularly favorable feed-in operation is achieved when in addition to the feeding in at a slowed transporting device, the spaces are enlarged prior to a feed-in operation and are again reduced after the feed-in operation. A relatively narrow feeding in is thus avoided and the feed-in operation is much safer. The slowing of the transporting device and the space enlargement supplement one another in an ideal manner for a feed-in operation.

BRIEF DESCRIPTION OF THE DRAWINGS

The invention will be described in greater detail hereinafter in connection with the figures, which illustrate exemplary embodiments, and in which.

DETAILED DESCRIPTION

Figure 1:
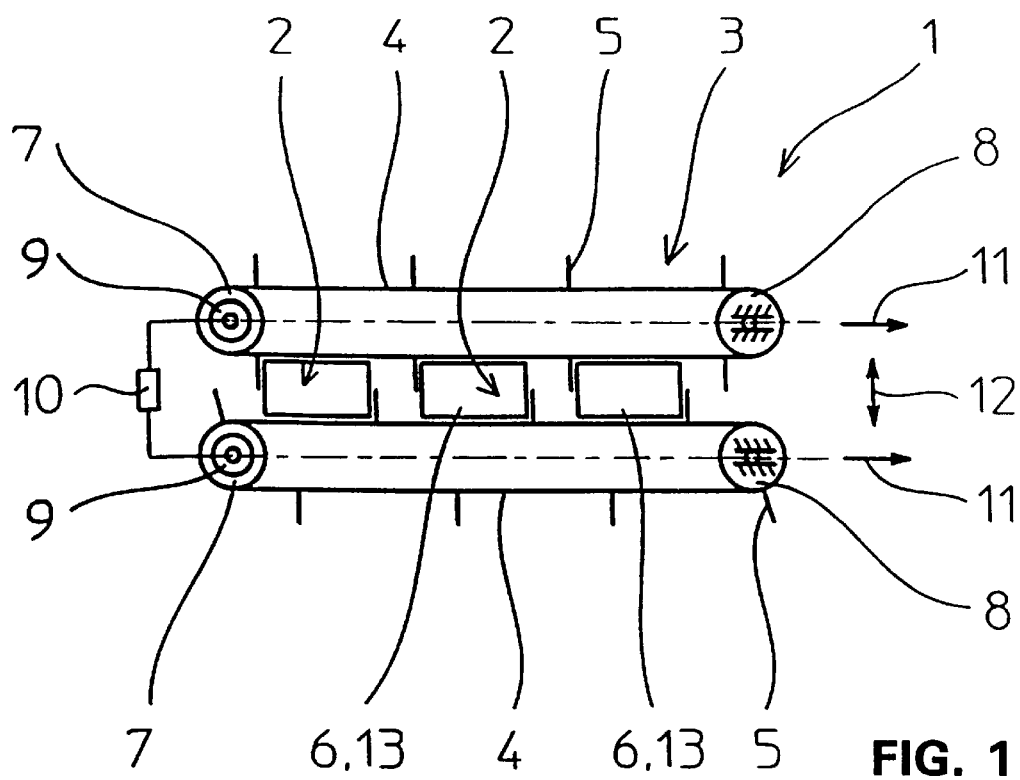
FIG. 1 is a top view of a transporting device with two oppositely driven synchronous belts, whereby partitions are mounted on each synchronous belt, with articles provided between the partitions, and with a control device, which is connected to the drives of the transporting device.

A transporting device 3 runs continuously, without standing still, in a device 1 for feeding tubular bags into spaces 2 (FIG. 1). The transporting device 3 has two closed synchronous belts with partitions 5 arranged equidistantly on the synchronous belts 4. The partitions 5 consist of a magnesium alloy and are therefore relatively light. The transporting device 3 has a relatively low inertia moment and can therefore move within a very short period of time to a higher or lower rotational speed.

An upwardly open folding box 6 is transported between each two partitions 5, into the inside space 2 of which folding box a tubular bag is supposed to be fed. The synchronous belts 4 rotate about gears 7, 8. The gears 7 are driven by oppositely directed drives 9. The drives 9 are connected to a control device 10. The control device 10 controls the drives 9 to slow down the transporting device 3 for a feed-in time period so that a tubular bag can be fed into a folding box 6 during a reduced transporting speed. After at least a partial feeding of the tubular bag into the folding box 6 at a specific moment or time of the feed-in time period, the transporting device 3 is again accelerated by a further signal of the control device 10. Thus the speed of the transporting device 3 is lower during a feed-in operation than the speed of the transporting device outside of the feed-in operation. The tubular bags can be safely fed in and the transporting device has a relatively high transporting performance. Due to the fact that the transporting device 3 never stops, a starting up from standstill is avoided, and the drives 9, which are servomotors, have relatively little wear and thus can be very inexpensive.

Figure 1A:
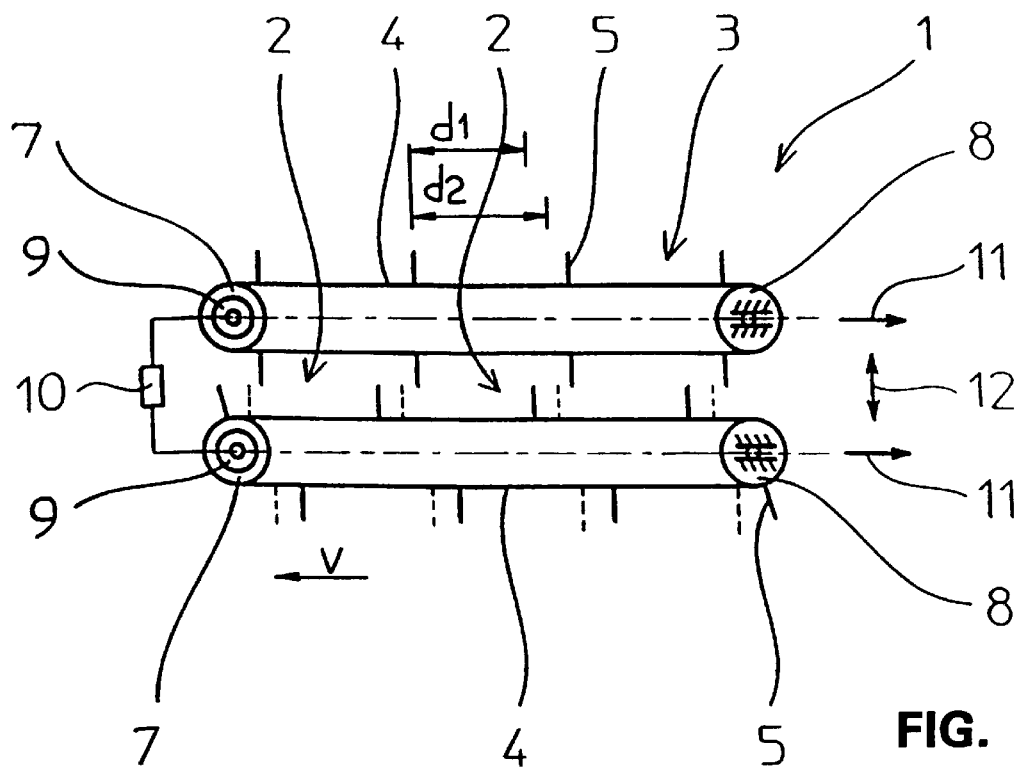
FIG. 1A is a view similar to FIG. 1 showing the normal size and enlarged size spaces in the transporting device.

The control device 10 could, in addition to the reduction of the transporting speed, also enlarge the spaces 2 prior to the folding boxes 6 being fed into the spaces 2 and reduce the spaces 2 after the feeding-in operation has occurred. Due to the fact that the folding boxes 6 are fed both during a time of reduced transporting speed and also into temporarily enlarged spaces 2, a very safe feeding in is possible at a very high average transporting speed. A change in the size of the spaces (e.g. d1 and d2, and back, see FIG. 1A) occurs due to a temporary non-synchronous running of the two drives 9.

The gears 8 can be adjusted in a tensioning direction 11 in order to change the synchronous belt tension. By shifting the synchronous belts 4 together with the gears 7, 8 in direction 12, articles 13 with a different width can be transported.

Figure 2:
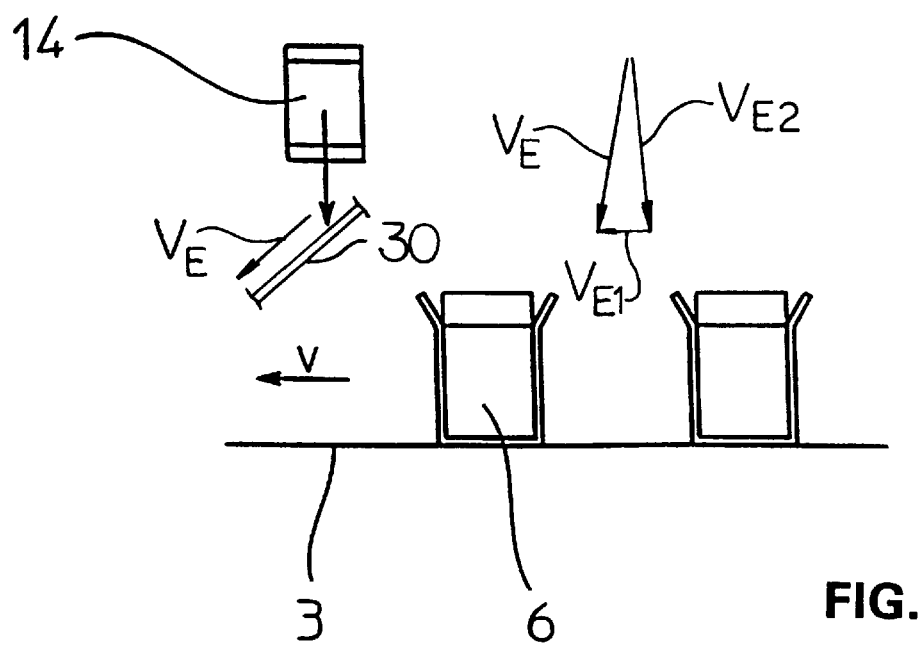
FIG. 2 is a side view of folding boxes, which are open at the top and are transported on a transporting device, and into which tubular bags are fed.
Figure 3:
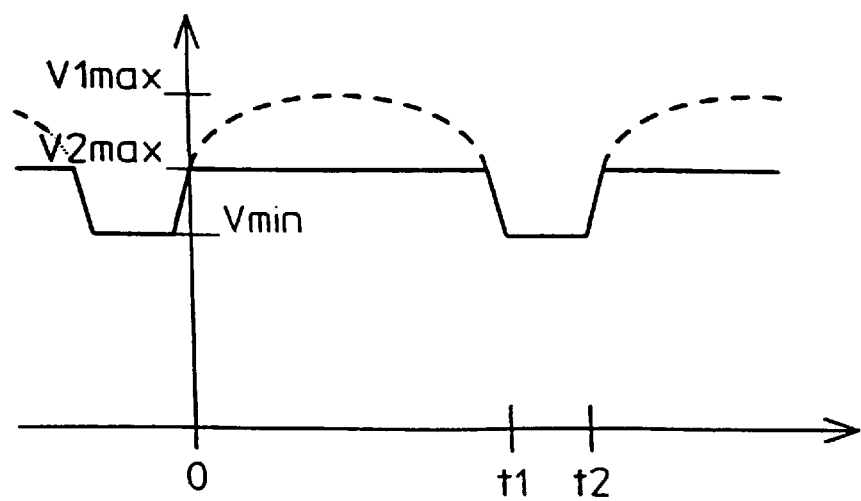
FIG. 3 is a diagram of the speed of a transporting device with respect to time.
Figure 4:
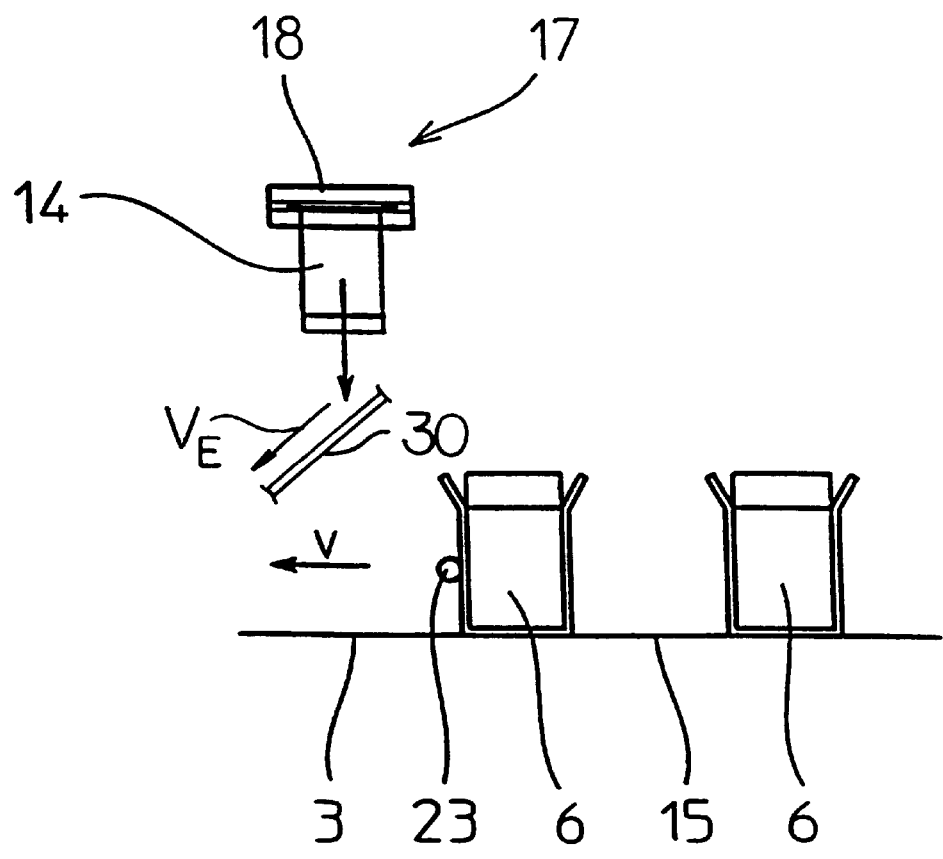
FIG. 4 is a side view of a tubular bag coming from a tubular bagging machine for feeding into a moving folding box.
Figure 6:
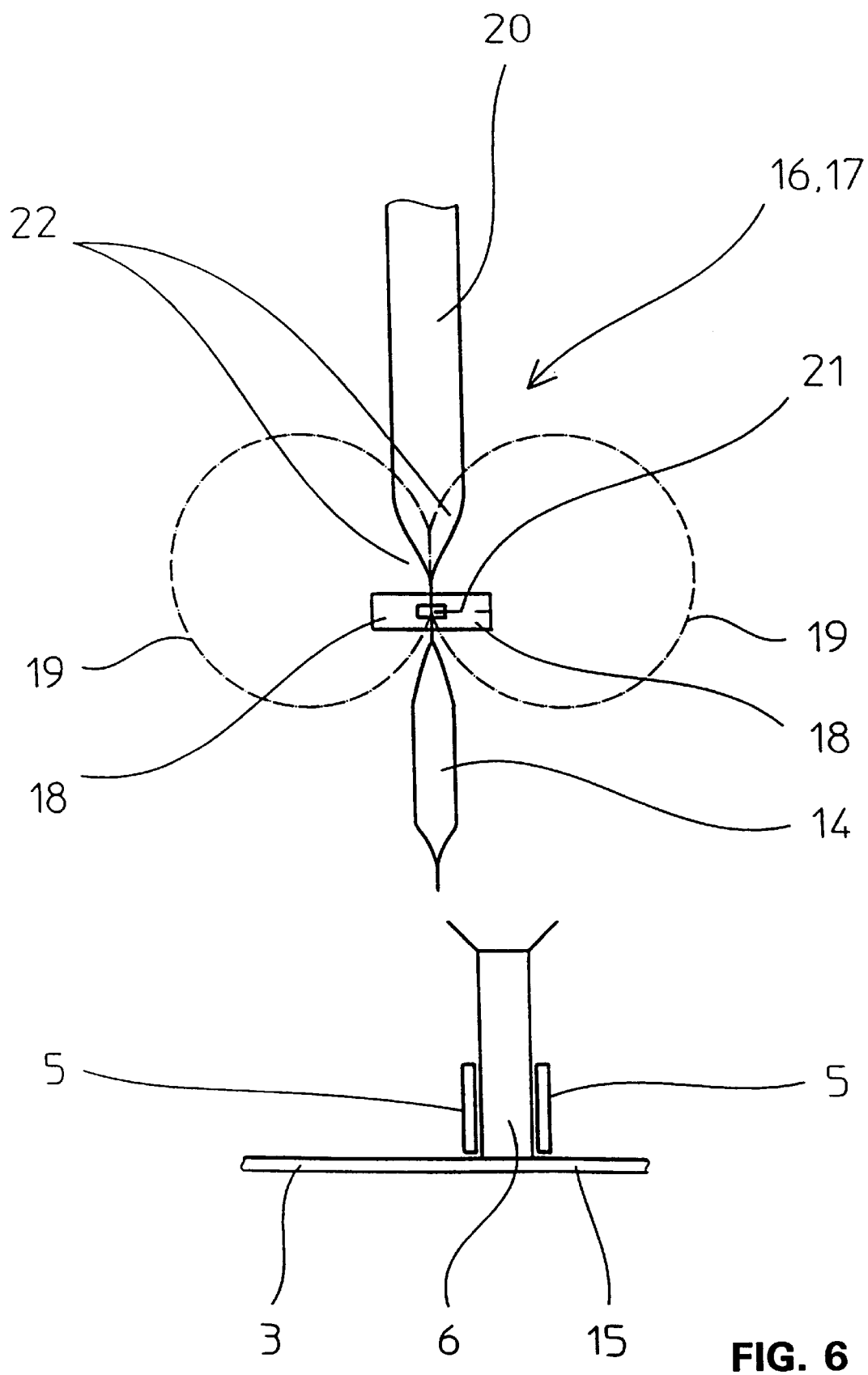
FIG. 6 is a side view of a tubular bag coming from a tubular bagging machine with cross-sealing jaws rotating along D-curves, which tubular bag is fed into a passing-by folding box.

In order to feed the tubular bags 14 into the folding boxes 6, the tubular bags 14 are subjected in a vertical direction downwardly to a free fall (FIG. 2). Shortly before the tubular bag 14 and the folding box 6 meet, at a moment or point in time $t_1$ (FIG. 3), the speed of the transporting device 3 has been reduced to a minimum value $V_{min}$ in order to achieve a safe entry of the tubular bag 14 into the folding box 6. At a moment or a point in time $t_2$, when the tubular bag 14 is already partly in the folding box 6, and can no longer fall out of the box, the speed V of the transporting device 3 is again increased to a maximum value $V_{max}$ in order to obtain a high transporting speed. The value $V_{max}$ can be maintained constant over a certain time period ($V_{2max}$) or can be continuously varied ($V_{1max}$) Due to the fact that the feed-in speed $V_E$ of the tubular bag is at least ten times higher than the transporting speed $V_{min}$ of the transporting device 3, a safe feeding in takes place. This relationship is reached through a suitable selection of the falling height of the tubular bag 14 and the speed reduction of the transporting device to the value $V_{min}$ The tubular bag 14 is, in the exemplary embodiment of FIG. 4, thrown downwardly with a defined initial speed $V_E$ by or from a cross-sealing jaw 18 of a vertical tubular bagging machine 16 (FIG. 6) in order to arrive in a passing-by folding box 6. The tubular bagging machine 16 is provided as a mechanism 17 for feeding in and has oppositely directed cross-sealing jaws 18, which cross-weld a foil tube 20 along a straight section 22 of a D-curve 19 thereof and separate a tubular bag 14 from the foil tube 20 by means of a separating device 21. Due to a constant downward speed of foil tube 20 and cross-sealing jaws 18 along the straight section 22, the feed-in speed $V_E$ at the time of the bag drop or release is exactly specified or predetermined. The feed-in speed is still further increased through the additional free fall after the release has occurred. This higher value is more than ten times the value of the reduced value $V_{min}$ of the transporting device 3.

A sensor 23 recognizes an arriving folding box 6, and thus its space 2 to be filled. The sensor 23 is connected to the control device 10. Thus the control device 10 receives information regarding the actual time of the arrival of a folding box 6, and the bag drop can be regulated in this respect. The transporting device 3 is part of a cartoning system 15.

Figure 5:
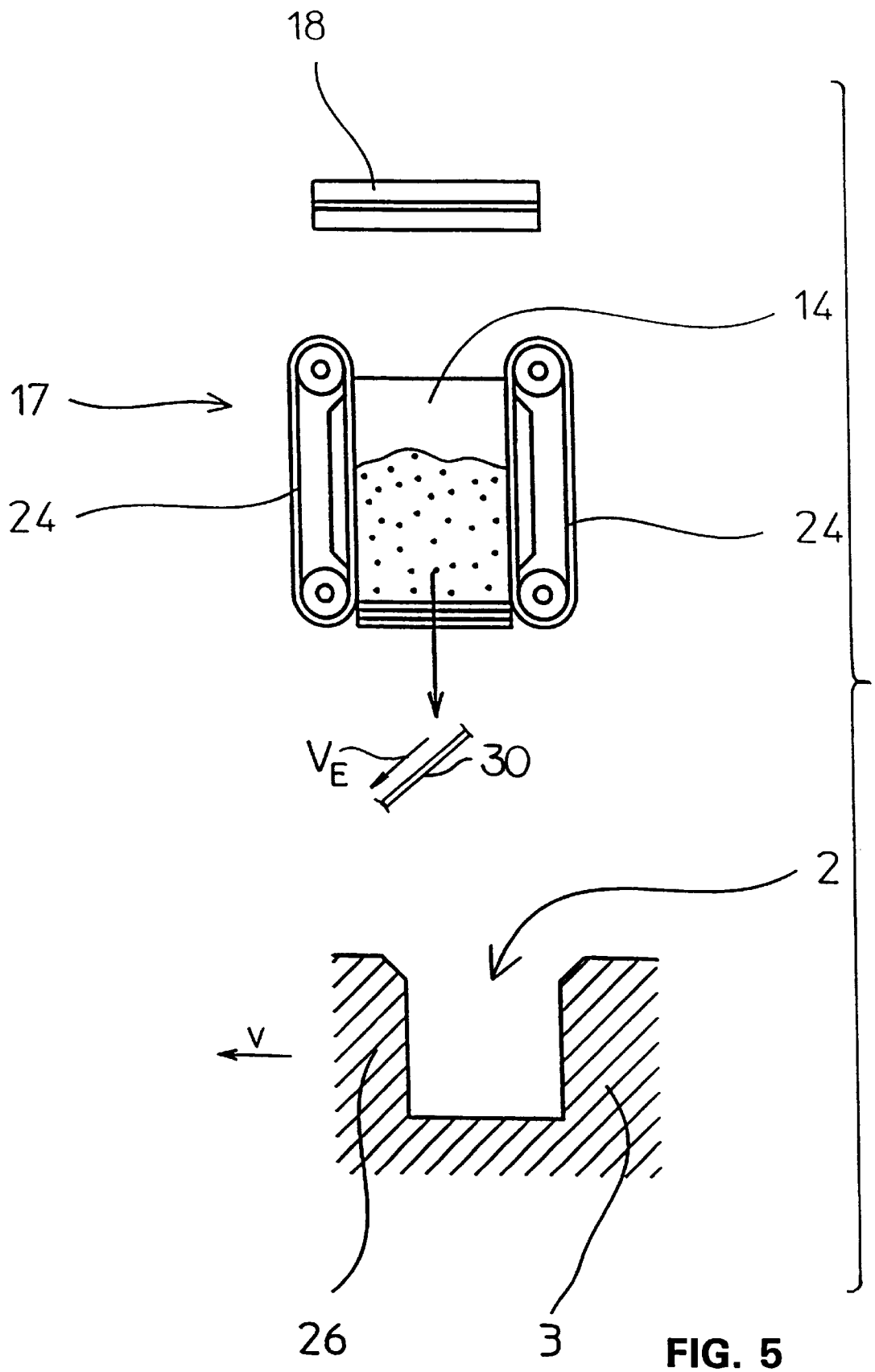
FIG. 5 is a side view of another embodiment of the invention including a filled tubular bag, which is held by two rotating belts, and which is arranged for feeding into a space of a cup band.

A tubular bag, which has been emitted by the cross-sealing jaws 18 of a tubular bagging machine is, in the exemplary embodiment of FIG. 5, transferred downwardly to a mechanism 17 for feeding in. The mechanism 17 has two oppositely rotating belts 24, which receive the tubular bag 14 between themselves. The distance between the belts 24 can be adjusted in order to be able to introduce differently wide tubular bags.

The transporting device 3 is a cup band. The inside of the cup 26 is the space 2, into which a tubular bag 14 is to be fed.

A tubular bag 14, which has been emitted by the cross-sealing jaws 18, is additionally accelerated by the relatively high rotational speed of the belts 24 and is thrown at a very high speed $V_E$ into the space 2. The belts 24 rotate at a constant speed. However, they could also be operated cyclically, whereby they throw off the tubular bag 14 at a point in time specified or predetermined by the control device.

What is claimed is:

1. A method for feeding of articles into a moving transporting device, comprising the steps of continuously moving without standstill the transporting device, feeding articles into provided spaces of the transporting device during a feed-in operation at a feed-in speed which is at least ten times greater than a transporting speed of the transporting device, and slowing the speed of the transporting device during the feed-in operation relative to the speed of the transporting device during a non-feed-in operation.

2. The method according to claim 1, wherein the step of moving the transporting device includes moving the articles in a horizontal direction.

3. The method according to claim 1, wherein the step of feeding includes moving the articles in a downward vertical direction into the spaces of the transporting device.

4. The method according to claim 3, wherein the step of feeding includes subjecting the articles to a free fall.

5. The method according to claim 3, wherein the step of feeding includes feeding the articles with a defined initial speed.

6. The method according to claim 1, wherein the step of feeding includes enlarging the spaces prior to the feed-in operation and reducing the spaces after the feed-in operation.

7. The method according to claim 2, wherein the articles have, directly prior to the feeding step, a first travel vector which is aligned parallel with respect to the transporting direction of the transporting device and a second travel vector transverse with respect to the transporting direction.

* * * * *